(12) United States Patent
Brewster et al.

(10) Patent No.: US 11,884,470 B2
(45) Date of Patent: Jan. 30, 2024

(54) VOID FILL PACKAGING

(71) Applicant: PPC Industries Inc., Pleasant Prairie, WI (US)

(72) Inventors: Christopher Brewster, Johnsburg, IL (US); Allan Guillen, Gurnee, IL (US); Renato Yutuc, Round Lake, IL (US)

(73) Assignee: PPC Industries Inc., Pleasant Prairie, WI (US)

( * ) Notice: Subject to any disclaimer, the term of this patent is extended or adjusted under 35 U.S.C. 154(b) by 50 days.

(21) Appl. No.: 17/461,219

(22) Filed: Aug. 30, 2021

(65) Prior Publication Data

US 2023/0065752 A1    Mar. 2, 2023

(51) Int. Cl.
| | |
|---|---|
| *B65D 81/03* | (2006.01) |
| *B29C 48/08* | (2019.01) |
| *B29C 48/10* | (2019.01) |
| *B29C 48/00* | (2019.01) |
| *B29L 31/00* | (2006.01) |

(52) U.S. Cl.
CPC ............ *B65D 81/03* (2013.01); *B29C 48/022* (2019.02); *B29C 48/08* (2019.02); *B29C 48/10* (2019.02); *B29L 2031/7138* (2013.01)

(58) Field of Classification Search
CPC .... B65D 81/03; B65D 81/052; B29C 48/022; B29C 48/08; B29C 48/10; B29L 2031/7138
See application file for complete search history.

(56) References Cited

U.S. PATENT DOCUMENTS

| | | | |
|---|---|---|---|
| 4,412,879 A | 11/1983 | Ottaviano | |
| 5,073,598 A | 12/1991 | Anzini | |
| 6,410,119 B1 | 6/2002 | De Luca et al. | |
| 7,807,253 B2 | 10/2010 | Kannankeril | |
| 8,679,603 B1 | 3/2014 | Mavridis et al. | |
| 9,017,799 B2 | 4/2015 | Chu et al. | |
| 9,243,087 B2 | 1/2016 | Karjala et al. | |
| 10,889,666 B2 | 1/2021 | Ruemer et al. | |
| 2003/0161999 A1 | 8/2003 | Kannankeril et al. | |
| 2009/0286023 A1 | 11/2009 | Dobreski et al. | |
| 2020/0017666 A1 | 1/2020 | Wang et al. | |
| 2022/0227977 A1* | 7/2022 | Kleczek | B32B 27/08 |

FOREIGN PATENT DOCUMENTS

| | | | | |
|---|---|---|---|---|
| WO | 2009040139 A1 | | 4/2009 | |
| WO | WO2010101915 | * | 9/2010 | ............ B65D 81/26 |
| WO | 2020229932 A1 | | 11/2020 | |

OTHER PUBLICATIONS

Hebert et al.; "Blown Film Extrusion of Post-Consumer Recycled Lldpe Film", Published Oct. 1, 1993 in Journal of Plastic Film & Sheeting vol. 9, Issue 4, Oct. 1993; pp. 282-292 [downloaded from https://journals.sagepub.com/doi/pdf/10.1177/ 875608799300900402 Aug. 26, 2021—Abstract Only].

Czamecka-Komorowska D., Wiszumirska K., Garbacz T. (2019) Manufacturing and Properties of Recycled Polyethylene Films with an Inorganic Filter by the Extrusion Blow Moulding Method. In: Gapiński B., Szostak M., Ivanov V. (eds) Advances in Manufacturing II. Manufacturing 2019. Lecture Notes in Mechanical Engineering. Springer, Cham. https://doi.org/10.1007/978-3-030-16943-5_54.

* cited by examiner

*Primary Examiner* — Michael C Miggins

(74) *Attorney, Agent, or Firm* — Nelson Mullins Riley & Scarborough LLP

(57) ABSTRACT

A void-fill package, and method of making the same, comprising at least 50%, on a weight basis of the package, recycled polyethylene; at least 40%, on a weight basis of the package, virgin polyethylene; at least one moisture scavenger; and at least one melt stabilizer.

14 Claims, No Drawings

VOID FILL PACKAGING

FIELD OF THE DISCLOSURE

The present disclosure relates to void-fill packaging and methods for making void-fill packaging.

BACKGROUND OF THE INVENTION

Void-fill packaging typically comprises lightweight materials that can act as a cushion for a product being packaged within a separate container, such as a cardboard box. Void-fill packaging can be utilized to fill void spaces within the separate container or can be wrapped around products to allow for safe transport. Examples of common void-fill packaging products include polymeric pillow materials, plastic bubble materials, small Styrofoam nuggets, or crumpled paper.

Polyethylene films are used in or with a wide range of packaging containers, products, and applications, including void-fill packaging. The physical properties of polyethylene, including tear strength, tensile strength, and impact strength, lend themselves well to void-fill packaging films, such as packaging pillows. These characteristics are desirable in void-fill packaging so that the packaging can be employed without the risk of physical failure. Transparency is another desirable property for void-fill packaging films, which is met via the use of polyethylene. For example, it may be necessary to inspect the item contained within the overall packaging through the void-fill packaging. Further, during manufacture, a photodetector may need to read print on the polymeric film, in some cases through contrast between the film and ink, which is more difficult with opaque films. Of course, it is also important for inflated or inflatable void-fill packaging film to be free of voids in the plastic to avoid inflation failures.

Rather than using virgin resins, the use of post-industrial, post-consumer, or other resins obtained from waste materials for the manufacturing of new products has gained interest due to a worldwide focus on environmental sustainability. However, one of the drawbacks to using recycled polyethylene to produce void-fill packaging films is the inconsistency in transparency in the resulting film. This inconsistency in transparency makes it more difficult for photodetectors, which rely on a differential of color contrast to detect a 'change' and signal an operation, to read printed marks on the film and detect where to seal, perforate or cut the film. The lack of consistency in transparency may also make it difficult for someone to inspect the item insulated by the film.

A further drawback in the use of recycled polyethylene for void-fill packaging is the potential that due to the inconsistent composition or presence of contamination in the recycled starting material, the resulting void-fill film will have voids within the film itself, creating a hole in the resulting film. A typical form of contamination could comprise moisture (a) contributed from the atmosphere; (b) incorporated into the starting recycled product during the recycling process; or (c) incorporated into the starting recycled product during conversion of the recycled material into pellets. If there is a hole in the film, even one that is not detectable to the human eye, the void-fill packaging film either will not inflate or will deflate during usage, rendering the void-fill packaging film useless for its intended purposes. Additionally, holes within the film create instability in the manufacturing process. If there are holes in the film, for example, the photodetector may not be able to read the marks on the film properly in order to properly detect where to seal, perforate, or cut the film.

Through ingenuity and hard work, the present inventors have developed an enhanced packaging film composition with improved consistency in the final product, improved clarity and transparency of the film, improved moisture content and melt stability, and significantly reduced failures in the film itself (i.e. holes).

BRIEF SUMMARY OF THE DISCLOSURE

In an embodiment, the invention comprises a void-fill package comprising at least 50%, on a weight basis of the package, recycled polyethylene; at least 40%, on a weight basis of the package, virgin polyethylene; at least one moisture scavenger; and at least one melt stabilizer. The recycled and/or virgin polyethylene may comprise linear low density polyethylene or octene copolymer linear low density polyethylene, in an embodiment. In an embodiment, the moisture scavenger comprises about 2% of the weight basis of the package. In an embodiment, the moisture scavenger comprises at least one of calcium oxide, calcium carbonate concentrated in linear low density polyethylene, talc and slip concentrated in linear low density polyethylene, or a polyolefinic polymer. In an embodiment, the melt stabilizer comprises about 8% of the weight basis of the package. In an embodiment, the melt stabilizer comprises a propylene elastomer, medium density metallocene polyethylene, low density metallocene polyethylene, or linear low density metallocene polyethylene.

In other embodiments, the invention comprises a void-fill package comprising at least 50%, on a weight basis of the package, recycled linear low density polyethylene; at least 40%, on a weight basis of the package, virgin octene copolymer linear low density polyethylene; about 2%, on a weight basis of the package, of calcium oxide; and about 8%, on a weight basis of the package, of at least one melt stabilizer.

In yet another embodiment, the invention comprises a method for forming a void-fill package comprising intermixing at least 50%, on a weight basis of the package, recycled polyethylene; at least 40%, on a weight basis of the package, virgin polyethylene; at least one moisture scavenger; and at least one melt stabilizer; heating the mixture to form a fluid composition; extruding the fluid composition to form at least one tubular film web; cooling the at least one tubular film web; and forming the at least one tubular film web into individual, separable pillows. In an embodiment, the forming step comprises: sealing the at least one tubular film web into individual pillows; and perforating the at least one tubular film web to form separable pillows. In an embodiment, the method additionally comprises printing the cooled tubular film web to display printed material; and reading the printed material with a photodetector, wherein the photodetector signals the location wherein the sealing and perforating steps should take place.

DETAILED DESCRIPTION OF THE DISCLOSURE

While this present disclosure may be embodied in many forms, there is shown in the drawings and will herein be described in detail one or more embodiments, with the understanding that this disclosure is to be considered an exemplification of the principles of the present disclosure and is not intended to limit the disclosure to the illustrated embodiments.

In an embodiment, the invention relates to inflated cushions formed from a polymeric film material, also referred to as pillows. This style of pillow packaging allows low-volume, uninflated pillow film materials to be shipped to packers, who then inflate the pillows, as needed, into shock-absorbing packing material. Pillow inflating machines may be used at the point of packaging to provide fully inflated pillows at the time of packaging, thereby eliminating the need to store bulky packaging materials at the packaging site.

Alternatively, the pillow film materials may be inflated at the manufacturing site. In such an embodiment, the inflation may occur in-line with the manufacturing process. The inflated pillows are often formed in a continuous strip of individual pillows, with perforations disposed therebetween. The desired length or number of the inflated pillows may be separated from the continuous strip before or after inflation, via separation of the perforations disposed between each pillow.

Polymer Base

In an embodiment, the polymer base of the invention comprises a mixture of recycled and virgin polymer. In an embodiment, the film of the invention comprises at least 50%, by weight of the film composition, recycled polymer. In an embodiment, the film of the invention comprises about 50%, by weight of the film composition, recycled polymer. Additives are discussed below, but the other majority component present in the polymer base may comprise virgin polymer. For example, in an embodiment, virgin polymer may be present in the composition in an amount of about 40% to about 44%, by weight of the composition. In another embodiment, virgin polymer may be present in the composition in an amount of about 40%, by weight of the composition.

In an embodiment, the recycled polymer and virgin polymer comprise the same polymer. In an embodiment, the recycled and virgin polymer each comprise polyethylene. Polyethylene is a high molecular weight polymer with a structure that is partially crystalline and partially amorphous. Many classes of ethylene polymers are currently known and can be utilized herein.

In a particular embodiment, the recycled and virgin polymer may each comprise linear low density polyethylene (LLDPE). Linear low-density polyethylene (LLDPE) is an ethylene polymer that can be easily heat sealed and has good barrier characteristics. LLDPE is useful in applications requiring tensile and impact strength properties, such as are required herein. In a particular embodiment, one or both of the recycled and virgin polymer may each comprise octene copolymer LLDPE.

In an embodiment, the recycled polyethylene comprises post-consumer or post-industrial polyethylene. In an embodiment, the recycled polyethylene content comprises post-industrial reprocessed resin. In an embodiment, the recycled polyethylene content comprises sorted scrap plastic packaging films. In an embodiment, the polyethylene content (virgin and/or recycled) may be pelletized. In an embodiment, the recycled polymer content comprises clear, transparent, translucent, or unprinted resins.

Additives

One or more additives may be present in the polymer compositions of the invention. One of skill in the art will understand the types and amounts of such additives which may be utilized herein. Some additive embodiments are set forth below. In an embodiment, the polymer composition comprises between about 0% and about 10% total additives, by weight of the polymer composition. In an embodiment, the polymer composition comprises between about 6% and about 10% total additives, by weight of the polymer composition. In an embodiment, the additives are added to the recycled and virgin polymer base and the mixture is heated and stirred to form a consistent melted mixture.

Moisture Scavenger

As used herein, the term "moisture scavenger" means a material that can improve the processing of composite materials by reacting with or binding water during melt processing. In an embodiment, the polymer composition may comprise between about 0% and about 5%, by weight of the polymer composition, of a moisture scavenger. In an embodiment, the polymer composition may comprise between about 2% and about 5%, by weight of the polymer composition, of a moisture scavenger. In another embodiment, the polymer composition may comprise about 2%, by weight of the polymer composition, of a moisture scavenger. In the present invention, moisture scavengers are used to chemically tie up, remove, or bind excess moisture in the polymeric mixture, prior to blown extrusion. If the polymeric mixture has excess moisture in it when extruded, the water molecules will expand during the heated extrusion process, cavitate the film, and create a void in the blown film tube. The polymeric film tubing is then unable to be inflated or deflates during use.

In an embodiment, the moisture scavenger(s) may comprise one or more of the following: calcium oxide, calcium carbonate concentrated in LLDPE, talc and slip (5% oleamide) concentrated in LLDPE, and/or a polyolefinic polymer. In an embodiment, the moisture scavengers utilized herein are untreated and/or unmodified.

Melt Stabilizers

Melt strength can be described as the resistance of the polymer melt to deformation. The melt strength of a material is related to the molecular chain entanglements of the polymer and its resistance to untangling under strain. The polymer properties affecting the resistance to untangling are molecular weight, molecular-weight distribution and molecular branching. As each property increases, melt strength is improved at low shear rates.

Branching and molecular-weight distribution have the most significant effect on melt strength while maintaining processability. Branched polymers (or those with a larger proportion of very long molecular chains) require greater strain to untangle the molecules and permit them to flow. Crosslinked polymers act similarly to branched polymers. Linear polymers are simply long polymer chains with little or no branching and are more easily untangled when a strain is applied.

Melt strength is important to void fill packaging because it influences drawdown and sag from the die to the rolls. With void fill film, melt strength impacts bubble stability and the ability to draw the film in the machine and transverse directions (MD, TD) to get balanced properties. A relative balance of melt strength can also help achieve interfacial stability.

Melt index (MI) measures viscosity by weighing the amount of plastic resin which extrudes from a cylinder with a hole in the bottom at 300 degrees for 10 minutes under test method ASTM D1238. In an embodiment, the recycled starting material has a melt index of between about 0.6 and 0.7 MI. In an embodiment, the recycled starting material has a melt index of between about 0.8 and 2.0 MI.

Melt stabilizers are chemical substances which, in an embodiment, are added to the intermixed virgin and recycled polymer and trap emerging free radicals or unstable intermediate products (such as hydroperoxides) in the course of autoxidation and to transform them into stable end products. This is important to the inventive process because free radicals and/or unstable intermediate products can cause bubble instabilities during the extrusion process. The use of melt stabilizers in the composition and methods of the invention may reduce or eliminate such instabilities in the formed bubble. Melt stabilizers additionally allow for compatibilization of incompatible plastics which could be present in trace amounts in post-industrial recycled film.

In an embodiment, the polymer composition may comprise between about 0% and about 8% melt stabilizers. In an embodiment, the polymer composition may comprise between about 5% and about 8% melt stabilizers. In an embodiment, the polymer composition may comprise about 8% melt stabilizer(s). In an embodiment, the melt stabilizer(s) may comprise one or more of the following: propylene elastomer, metallocene medium density polyethylene (mMDPE).

Fillers

In an embodiment, no fillers are utilized in the invention. Polymers are generally expensive and fillers are known to be utilized to offset the expense of polymers. However, the additives utilized in the present invention are each designed for a specific purpose and are not utilized as fillers, in an embodiment. For example, the moisture scavenger(s) is added during the melt phase for the specific purpose of binding any moisture in the melt mixture prior to extrusion. The timing of its addition, the amount of the moisture scavenger, and the moisture scavenger utilized are optimized for the purposes set forth herein.

Method

In an embodiment, the invention comprises formation of narrow width tubing. In an embodiment, the monolayer film of the invention is extruded using a multi-head die. In an embodiment, the die utilized in the present invention has four (4) heads. In an embodiment, the process does not involve use of single-wound sheeting (i.e. lay flat polyethylene tubing slit on both sides, creating two sheets on top of each other and wound separately) or slit sealing (i.e. slitting the material and then sealing it) and is, in fact, improved over such processes. Side seal operations typically occur in a non-in-line process (adding to cost, time, etc.) and side seal failures often occur during slit sealing. In contrast, the method of the invention allows the formation of a continuous tubular film that does not require side sealing, significantly reducing the potential for leakage of air from the formed pillows.

In an embodiment, the film is formed according to the following process. The materials set forth above may be intermixed and heated to form a melted mixture. For example, the inventive composition may comprise 50% recycled polymeric resin, 40% virgin resin, 2% moisture scavenger, and 8% melt stabilizer.

The mixture may then be extruded as a monolayer, tubular blown film web. In an embodiment, the film is cooled and optionally printed (optionally in an in-line process). The tubular web of film is then sealed, in an embodiment, at intervals along its length, in the machine direction, to form individual cushion or pill portions. In an embodiment, the printed, sealed film is then perforated through the seal to form separable cushions. More particularly, in an embodiment, a photodetector is used to identify a printed mark, which then actuates the machine to seal and perforate the film in a particular location indicated by the printed mark (optionally in the same or consecutive processes), thus creating the pillow. Optionally, a printed image, such as a logo, trademark, or other source indicator, may be printed on each pillow.

In an embodiment, a stable polymer composition is necessary to utilize the process described herein. For example, if the blown film web flutters, is too thick or too thin in certain areas, is too cloudy or hazy, or if there are voids in the film, the printed material may not be accurately printed, the photodetector may not accurately identify the printed material and, therefore, may not correctly prompt the automation of the sealing and perforation processes. Thus, it is imperative that the polymer composition, as set forth herein, is stable and produces a strong, consistent blown film web.

The above-noted processes may occur in an in-line manner, in an embodiment. Alternatively, the above-noted processes may occur in an off-line manner, in an embodiment. As noted, the film may be transported to a processing facility and inflated in a secondary process to form protective packaging pillows or cushions or may be inflated in an in-line process.

Advantageously, the present invention may provide a blown film tube and/or protective film pillow product having an improved consistency in the final product, despite variations in the material content of the recycled materials. The inventive product may have improved clarity and transparency of the film, making printing and photodetection easier. The inventive product may have an improved moisture content, avoiding voids in the film as discussed above, and may have improved melt stability. The improvements to the product composition (clarity, moisture, melt stability) provide a more stable blown film bubble and such stability allows the use of an in-line, multi-headed die process rather than a slit sealing process.

Many modifications and other embodiments of the present disclosure set forth herein will come to mind to one skilled in the art to which the present disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A void-fill package comprising:
   at least 50%, on a weight basis of the package, recycled polyethylene;
   at least 40%, on a weight basis of the package, virgin polyethylene;
   at least one moisture scavenger; and
   at least one melt stabilizer, wherein the at least one melt stabilizer comprises one of a propylene elastomer, medium density metallocene polyethylene, low density metallocene or linear low density metallocene polyethylene.

2. The void-fill package of claim 1 wherein the recycled polyethylene comprises linear low density polyethylene.

3. The void-fill package of claim 1 wherein the virgin polyethylene comprises linear low density polyethylene.

4. The void-fill package of claim 1 wherein the recycled polyethylene comprises octene copolymer linear low density polyethylene.

5. The void-fill package of claim 1 wherein the virgin polyethylene comprises octene copolymer linear low density polyethylene.

6. The void-fill package of claim 1 wherein the recycled polyethylene and virgin polymer polyethylene each comprise octene copolymer linear low density polyethylene.

7. The void-fill package of claim 1 wherein the moisture scavenger comprises about 2% of the weight basis of the package.

8. The void-fill package of claim 1 wherein the moisture scavenger comprises at least one of calcium oxide, calcium carbonate concentrated in linear low density polyethylene, talc and slip concentrated in linear low density polyethylene, or a polyolefinic polymer.

9. The void-fill package of claim 1 wherein the moisture scavenger comprises calcium oxide.

10. The void-fill package of claim 1 wherein the melt stabilizer comprises about 8% of the weight basis of the package.

11. The void-fill package of claim 1 wherein the recycled polyethylene comprises post-industrial reprocessed resin.

12. The void-fill package of claim 1 wherein the recycled polyethylene comprises sorted scrap plastic packaging films.

13. The void-fill package of claim 1 wherein the recycled polyethylene comprises clear, transparent, translucent, or unprinted resins.

14. A void-fill package comprising:
    at least 50%, on a weight basis of the package, recycled octene copolymer linear low density polyethylene;
    at least 40%, on a weight basis of the package, virgin octene copolymer linear low density polyethylene;
    about 2%, on a weight basis of the package, of calcium oxide; and
    about 8%, on a weight basis of the package, of at least one melt stabilizer, wherein the at least one melt stabilizer comprises one of a propylene elastomer, medium density metallocene polyethylene, low density metallocene or linear low density metallocene polyethylene.

* * * * *